(12) United States Patent
Bussonniere et al.

(10) Patent No.: US 11,090,698 B2
(45) Date of Patent: Aug. 17, 2021

(54) METHOD FOR INCREASING THE ABILITY OF AT LEAST ONE DROPLET TO SLIDE OVER A MEDIUM

(71) Applicants: UNIVERSITÉ DE LILLE, Lille (FR); CENTRE NATIONAL DE LA RECHERCHE SCIENTIFIQUE, Paris (FR); ECOLE CENTRALE DE LILLE, Villeneuve d'asq (FR)

(72) Inventors: Adrien Bussonniere, Edmonton (CA); Olivier Bou Matar-Lacaze, Saint-amand-les-eaux (FR); Michaël Baudoin, Lezennes (FR); Philippe Brunet, Paris (FR)

(73) Assignees: UNIVERSITÉ DE LILLE, Lille (FR); CENTRE NATIONAL DE LA RECHERCHE SCIENTIFIQUE, Paris (FR); ECOLE CENTRALE DE LILLE, Villeneuve d'asq (FR)

( * ) Notice: Subject to any disclaimer, the term of this patent is extended or adjusted under 35 U.S.C. 154(b) by 199 days.

(21) Appl. No.: 16/060,504

(22) PCT Filed: Dec. 6, 2016

(86) PCT No.: PCT/EP2016/079902
§ 371 (c)(1),
(2) Date: Jun. 8, 2018

(87) PCT Pub. No.: WO2017/097769
PCT Pub. Date: Jun. 15, 2017

(65) Prior Publication Data
US 2018/0369880 A1     Dec. 27, 2018

(30) Foreign Application Priority Data

Dec. 9, 2015 (FR) .................................. 1562067

(51) Int. Cl.
*B08B 7/02* (2006.01)
*B08B 17/02* (2006.01)
(Continued)

(52) U.S. Cl.
CPC .............. *B08B 7/028* (2013.01); *B06B 1/067* (2013.01); *B08B 3/12* (2013.01); *B08B 17/02* (2013.01);
(Continued)

(58) Field of Classification Search
CPC ........... B08B 7/028; B06B 1/067; B06B 3/02; B06B 2201/76; F15D 1/002; F15D 1/0065
See application file for complete search history.

(56) References Cited

U.S. PATENT DOCUMENTS

2013/0298419 A1   11/2013   Trevett et al.
2014/0144518 A1*  5/2014   Bohringer ........... B01L 3/50273
                                                             137/13

FOREIGN PATENT DOCUMENTS

EP    2663475 A1   11/2013
GB    2518136 A     3/2015
(Continued)

OTHER PUBLICATIONS

Baudoin et al.,"Low power sessile droplets actuation via modulated surface acoustic waves", Appl. Phys. Lett. 100, 154102 (2012) (Year: 2012).*
(Continued)

*Primary Examiner* — Natasha N Campbell
(74) *Attorney, Agent, or Firm* — Cooper Legal Group, LLC; Ronald M. Kachmarik

(57) ABSTRACT

Method for increasing the ability of at least one droplet to slide over a medium. An ultrasonic surface wave is generated in the medium with a sufficient amplitude to cause the droplet to deform in an inertio-capillary eigen-vibration
(Continued)

mode, thus decreasing the attachment of the droplet to the medium, so as to make it easier for the droplet to move under the effect of an external force, the amplitude of the ultrasonic surface wave being insufficient to cause the droplet to deform asymmetrically to the point that it moves in the absence of the external force in the direction of propagation of the ultrasonic surface wave.

17 Claims, 2 Drawing Sheets

(51) Int. Cl.
*B60S 1/02* (2006.01)
*G02B 27/00* (2006.01)
*B06B 1/06* (2006.01)
*B08B 3/12* (2006.01)
*B60J 1/00* (2006.01)

(52) U.S. Cl.
CPC ............ *B60S 1/02* (2013.01); *G02B 27/0006* (2013.01); *B60J 1/002* (2013.01)

(56) References Cited

FOREIGN PATENT DOCUMENTS

| | | |
|---|---|---|
| JP | H08140898 | 6/1996 |
| WO | 2012095643 A1 | 7/2012 |
| WO | 2013004962 A1 | 1/2013 |

OTHER PUBLICATIONS

Corresponding International Application, International Search Report, Application No. PCT/EP2016/079902, dated Mar. 23, 2017, 6 pages.

* cited by examiner

METHOD FOR INCREASING THE ABILITY OF AT LEAST ONE DROPLET TO SLIDE OVER A MEDIUM

FIELD OF THE INVENTION

The present invention relates to a method for facilitating the sliding of at least one droplet of a liquid on a substrate.

BACKGROUND OF THE INVENTION

In various fields, it is necessary to eliminate the effects associated with the accumulation of a liquid on a surface. For example, in medical applications, it may be necessary to prevent or at least delay the coagulation of a droplet of blood on a surface, without having to add an anticoagulant. In optics, the condensation of droplets of water on a lens may prevent correct observation and it must therefore be cleaned, which proves tedious. As an additional example, the accumulation of condensates of combustion products or of droplets of fuel on certain engine components may lower their energy efficiency.

Precise control of the movement of droplets on a surface may also be useful.

To remove the droplets of liquid that have accumulated on a surface, it is well known to apply a mechanical force on the droplets, for example by means of a windshield wiper on a windshield of a motor vehicle. However, a windshield wiper restricts the field of view available to the driver. Moreover, it spreads the grease particles deposited on the surface of the windshield. In addition, the fittings of the windshield wiper must be renewed regularly. Furthermore, a mechanical force cannot easily be applied on the droplets in a great many applications, for example in microfluidics owing to lack of space available for providing suitable mechanical means, which might, moreover, damage the surfaces.

One known way of removing droplets that have accumulated on a surface consists of functionalizing said surface. For example, applications US 2014/0817666 and US 2014/290732 describe a substrate covered with a porous body, with pores of nanometric or micrometric size, thus forming a functionalized surface. When a droplet of liquid is deposited on this functionalized surface, the porous body is impregnated with the liquid, thus forming a lubricating layer between the substrate and the droplet, which can slide on the surface easily. However, the number of materials constituting substrates suitable for surface functionalization is limited. Furthermore, surface functionalization may alter surface properties other than wettability. For example, it is of little interest for applications involving the optical properties of the surfaces. Finally, after several cycles of saturation and drying of the surface, the pores of the porous body gradually become filled through accumulation of the residual particles contained in the liquid, and eventually the lubricating layer can no longer form. The functionalized surface then loses its ability to promote sliding of the droplet.

The application of an electric field for controlling the hydrophobicity of a surface is also known, notably in the field of microfluidics. This technique, known by the acronym EWOD (Electro Wetting On Devices), consists of applying a potential difference between two electrodes, so as to polarize the surface electrically to make it hydrophilic, thus loosening the droplet from the surface. By controlling the location of the polarization, the droplet may then be moved. However, few materials are suitable for this technique, which moreover is unsuitable for substrates of large thickness. Moreover, the EWOD technique requires particularly precise positioning of the electrodes on the entire surface where control of the wetting properties is required.

Removal of droplets by causing the substrate on which they are resting to vibrate is also known, notably by generating an ultrasonic surface wave so as to cause movement of the droplets on the surface or to vaporize the droplets. Ultrasonic surface waves have the advantage that they can easily be generated by means of a transducer. Furthermore, they suffer little attenuation and can be propagated over large distances.

GB 2 387 107 and GB 1 037 787 describe a helmet vizor and a windshield, respectively, comprising a transducer for generating an ultrasonic wave for removing raindroplets. However, these documents say nothing about the characteristics of the ultrasonic wave.

U.S. Pat. No. 4,768,256 describes a device for displacing raindroplets from a windshield, in which an ultrasonic wave applied on the windshield causes the raindroplets to move in the direction opposite to the direction of propagation of the longitudinal ultrasonic wave.

In the article "*Low power sessile droplets actuation via modulated surface acoustic*", M. Baudoin, P. Brunet, O. Bou Matar and E. Herth, Appl. Phys. Lett., Vol. 100, 154102 (2012), a method has recently been described in which an ultrasonic surface wave is applied to a substrate on which there is a droplet of water, with a frequency and an amplitude such that the droplet vibrates and is deformed asymmetrically, causing it to move in the direction of propagation of the ultrasonic surface wave.

FR 1 308 877 and WO 2012/095643 describe a method for removing raindroplets from a windshield by ultrasonic evaporation. The amplitude and frequency of vibration are selected so that the raindroplets falling on the windshield cannot come into contact with the latter, and are vaporized once they enter the zone of vibrational motion of the surface of the windshield.

However, in order to obtain evaporation or movement of a droplet of liquid, the power required to cause vibration of one of the substrates as described is particularly high, which limits practical application of them, notably for the development of autonomous devices. In particular, although FR 1 308 877 and WO 2012/095643 do not specify the amplitudes and frequencies of the waves generated for vaporizing the droplets, it is well known that evaporation requires more energy than that required for moving droplets on a substrate.

There is therefore a need for a method that can be implemented easily, allowing the removal of a droplet of a liquid adhering to the surface of a substrate, and applicable to substrates of varying shape, size and constituent material.

BRIEF SUMMARY OF THE INVENTION

The invention aims to satisfy this need, and it achieves this by proposing a method for promoting sliding of at least one droplet on a substrate, a method in which an ultrasonic surface wave is generated in the substrate with a sufficient amplitude to cause the droplet to be deformed according to an inertio-capillary eigenvibration mode, thus reducing the attachment of the droplet to the substrate, so as to facilitate movement of the droplet under the effect of an external force, the amplitude of the ultrasonic surface wave being insufficient to lead to asymmetric deformation of the droplet to the point of causing it to move in the absence of the external force in the direction of propagation of the ultrasonic surface wave.

The method according to the invention is particularly remarkable in that the droplet is released from the irregularities of the substrate that prevented its movement, by means of an ultrasonic wave of lower power than that used in the methods of the prior art described above. The droplet may then be moved more easily by application of the external force, notably of low amplitude. "Release of the droplet" means that the inertio-capillary vibrations of the droplet make it possible to release the line of contact or triple line (in contact simultaneously with the substrate, the droplet, and the surrounding gas, for example air) initially trapped in surface irregularities, notably chemical and mechanical.

Furthermore, the method according to the invention is particularly robust in that it allows active control of the vibrations of the surface and therefore of the droplet. Consequently, it is possible to adapt the vibrations of the surface as a function of the condition of the surface. The method according to the invention is thus less sensitive to contaminants and surface defects of the substrate than the methods of the prior art.

Moreover, the method according to the invention also allows precise control of the movement of the droplet on the substrate.

The higher energy efficiency of the method according to the invention may be attributed to the fact that in the prior art, the droplet is moved on the surface of the substrate without vibration of the lines of contact. It is therefore necessary to supply sufficient energy to the droplet in order to exceed the so-called hysteresis angle, starting from which the lines of contact leave the traps formed by the irregularities, and succeed in moving the droplet. Greater supply of energy than with the method according to the invention is thus necessary to move it. In particular, the power of the ultrasonic surface wave used in the method according to the invention to promote sliding of a droplet may be at least 10 times, or even at least 30 times, lower than the power of an ultrasonic wave used in the prior art for moving a droplet.

Moreover, as will be seen hereunder, the method according to the invention is particularly versatile. Notably, it may be applied to a wide range of substrates, micrometric or of several tens of meters in length, provided they have sufficient rigidity for an ultrasonic surface wave to be propagated thereon, both thin and thick. Moreover, the method according to the invention is not limited to a specific type of liquid.

Implementation of the invention is thus simplified, and notably it does not require any complex, special treatment of the substrate surface.

Surprisingly, and as yet unexplained, it has been observed that the vibration according to the inertio-capillary mode of the droplet takes place at a low frequency, lower, in particular at least 60 000 times lower, or even 1 million times lower than the fundamental frequency of the ultrasonic surface wave. Moreover, it was found that it is possible to cause droplets of varying diameter to vibrate according to their natural inertio-capillary mode by stressing the surface with a wave with the same fundamental frequency. Thus, a wave with the same frequency can cause vibration of droplets of very different sizes.

An "inertio-capillary eigenvibration mode" of a droplet is an oscillation resonance mode of the droplet resulting from competition between the droplet's inertia and its surface tension. It was demonstrated by Rayleigh, Proc. R. Soc. London, Vol. 29, 71 (1879) and H. Lamb, "*Hydrodynamics*", Cambridge University Press, England (1932). It is also generally called the Rayleigh-Lamb mode.

BRIEF DESCRIPTION OF THE DRAWINGS

The invention may be understood better on reading the detailed description given hereunder, of nonlimiting embodiment examples thereof, and on examining the accompanying drawing, where various devices for implementing the method according to the invention are shown schematically in FIGS. 1 and 4.

In the accompanying drawing, the real proportions of the various constituent elements have not always been respected, for the sake of clarity.

DETAILED DESCRIPTION OF THE INVENTION

Substrate

Figure 1:
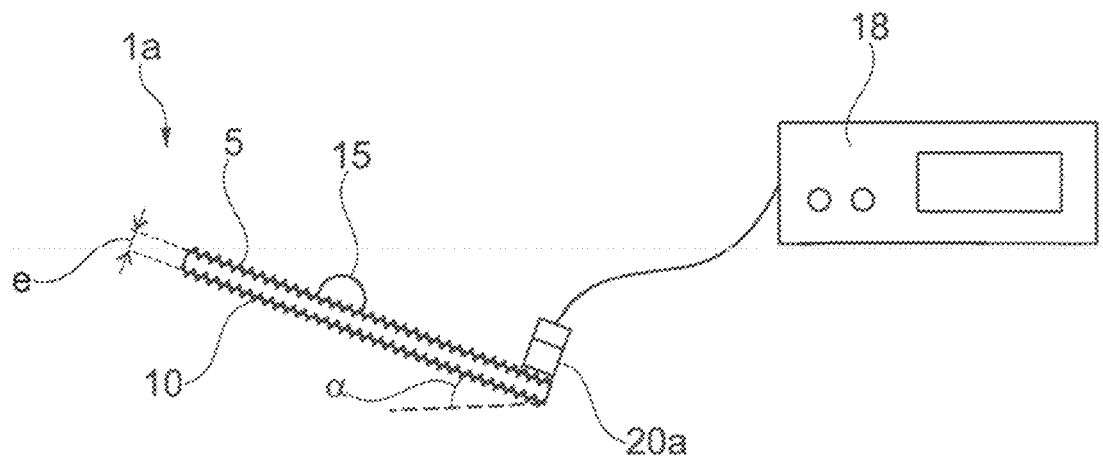
FIGS. 1 to 4 illustrate devices 1*a-d* for implementing the method according to the invention, comprising a substrate 5 capable of propagating an ultrasonic surface wave 10, a liquid droplet 15 and a means 20 for generating the ultrasonic surface wave.

The substrate 5 may be made of any material capable of propagating an ultrasonic surface wave 10. Preferably it is made of a material having an elastic modulus above 0.1 MPa, for example above 10 MPa, or even above 100 MPa, or even above 1000 MPa, or even above 10000 MPa. A material having such an elastic modulus has a rigidity that is particularly suitable for the propagation of ultrasonic surface waves.

The substrate may be flexible, in the sense that it can be deformed, notably elastically, without breaking under its own weight.

In particular, it may be selected from piezoelectric materials, polymers, in particular thermoplastics, glasses, metals and ceramics.

The surface of the substrate on which the longitudinal surface wave is propagated may be flat. It may also be curved, provided that the radius of curvature of the surface is greater than the wavelength of the ultrasonic surface wave.

The surface may be rough, with a roughness Ra less than the wavelength.

The substrate may notably be in the form of a flat plate, as illustrated for example in FIG. 1, or may have at least a curvature in one direction, with thickness e less than 0.01 m. The length of the plate may be greater than 0.1 m, or even greater than 1 m, or even greater than 10 m.

"Thickness of the substrate" means the smallest dimension of the substrate measured in a direction perpendicular to the surface on which the ultrasonic wave is propagated.

Figure 2:
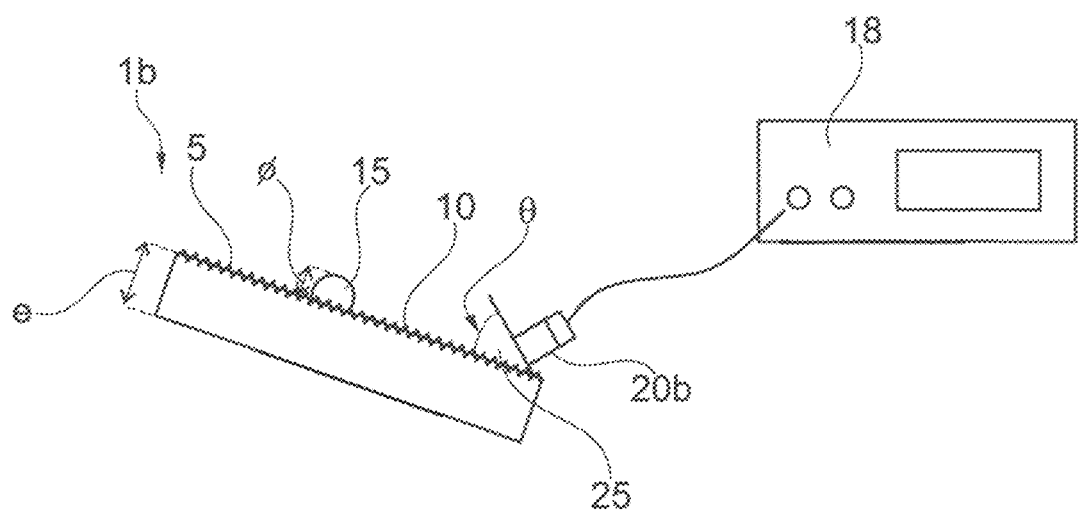

As a variant, the substrate may be in the form of a block, the thickness of which is for example greater than 0.05 m, or even greater than 0.1 m, as illustrated for example in FIG. 2.

The substrate may be arranged flat relative to the horizontal. As a variant, it may be inclined to the horizontal at an angle α greater than 10°, or even greater than 20°, or even greater than 45°, or even greater than 70°. It may be arranged vertically.

In one embodiment, the substrate is made of a material that is optically transparent, notably to light in the visible range. The method according to the invention is then particularly suitable for applications requiring improvement of the visual comfort of a user observing his environment through the substrate.

An optically transparent material is notably suitable for forming, wholly or partly:

vehicle glazing, notably a windshield, side glazing or a rear window of a motor vehicle, a window pane of a building, a lens of an optical device selected from a spectacle lens, a field-glass, a telescope, a microscope, a camera lens, binoculars, a rearview mirror.

For the applications in which such substrates are used, the method according to the invention makes it possible to reduce the surface density of droplets in contact with the transparent material. As described above, the method according to the invention releases the droplets from the substrate, and removes them by means of the external force. This prevents the formation of accumulations of liquid by cohesion of the droplets moving in contact with the surface as in the methods of the prior art, these accumulations of liquid altering the optical properties of the substrate.

Notably, the method according to the invention may be implemented in such a way that the substrate is self-cleaning.

Other types of substrate are conceivable. Notably, the substrate may be a substrate of a laboratory on a chip, notably intended for microfluidic applications. It may be an internal wall of a combustion engine. The method according to the invention may thus improve engine efficiency, by effectively removing the droplets that form on the wall by condensation of the combustion products or by deposition of unused droplets of fuel. The substrate may be an element of a turbine, for example: a blade, notably of an airplane engine.

It may be an electric cable. For example, in the variant in which the substrate is an electric cable of a high-voltage line and/or for supplying a railroad track, by promoting sliding of the raindroplets that are deposited on the electric cable, the method according to the invention reduces the effects of the rain causing vibration of the electric cable and of the posts supporting it. Furthermore, in winter conditions, by promoting sliding of the raindroplets that are deposited on the electric cable, the method according to the invention limits the formation of frost or ice on the cables. Thus, the risk of damage or even breakage of the cables is reduced.

The substrate may be an element of the structure of an aircraft, for example a wing, a fuselage or a tail unit. As described in the preceding paragraph, by promoting sliding of the droplets on these elements, the method according to the invention limits the formation of frost or ice on the structure of the aircraft.

The substrate may be an element of a medical implant. In particular, the amplitude and the fundamental frequency of the ultrasonic surface wave may be selected so as to promote sliding of a droplet of blood to prevent its coagulation, or of a biological fluid, to prevent deposition of the biological material contained in the biological fluid on the surface.

The substrate may also be selected from an element of a heat exchanger, a plumbing installation, an element of a ventilation system, an element of a system for extracting oil from a well, for example a pipe. Such substrates generally have surfaces that are difficult to reach to remove the droplets of liquid that are deposited thereon, for example by condensation. The method according to the invention is therefore particularly suitable for substrates of this type.

The substrate may be an element for storage of food, for example an internal wall of a refrigerator, or a wall exposed to condensation of a liquid. For example, in a refrigerator, condensation of droplets of water on a wall increases the heat exchange between the wall and the volume of cool air in the refrigerator, reducing its efficiency.

As already illustrated above, the method according to the invention may be implemented in applications where high temperatures are encountered. Preferably, the surface temperature of the substrate is then above 100° C., or even above 300° C., or even above 500° C.

Liquid Droplet

In a preferred embodiment, the surface of the substrate is at least partially covered with a plurality of liquid droplets.

The liquid droplet 15 may have a size at rest Φ less than 5 mm, notably between 0.1 mm and 1.5 mm, for example equal to 1 mm. "Size at rest" of the droplet means the distance between the point of the droplet farthest from the surface and the latter, without any longitudinal surface wave being applied to the substrate. In the present description, when reference is made to the size of the droplet, it is the size of said droplet at rest, unless stated otherwise.

The substrate may be covered with a plurality of droplets having a multimodal distribution of droplet sizes. Then preferably a plurality of ultrasonic surface waves is generated in the substrate, with fundamental frequencies and amplitudes suitable for causing each droplet of the plurality of droplets to be deformed according to an inertio-capillary vibration mode.

The method according to the invention is particularly versatile in that it makes it possible to promote sliding of droplets consisting of liquid with varied properties. As an example, the viscosity of the liquid may be between 0.0001 and 2 Pa·s at 25° C.

Preferably, the liquid making up the droplet is selected from water, notably rain water, a biological fluid, for example animal or human blood, a liquid for cleaning the substrate, a chemical solution, a motor fuel, and mixtures thereof.

In one embodiment, the substrate is covered with droplets consisting of a first liquid and droplets consisting of a second liquid different than the first, without reducing the effectiveness of the method.

In particular, the liquid may have a contact angle with the substrate less than 180°, notably less than 120°. The method according to the invention may thus promote sliding of a droplet lying on a hydrophilic or hydrophobic substrate.

The liquid may comprise particles, for example colloidal particles. It may comprise an active principle or a medicinal product.

When it is caused to vibrate according to an inertio-capillary mode, the droplet vibrates by deforming at low frequency, which depends notably on the properties, in particular the density, of the liquid forming the droplet. Preferably, the frequency of vibration of the droplet according to the inertio-capillary mode is between 20 Hz and 10 kHz.

Ultrasonic Surface Wave

The fundamental frequency and the amplitude of the ultrasonic surface wave are preferably determined as a function of the properties of the substrate and of the liquid.

In particular, a person skilled in the art is able to determine the length of transmission of the ultrasonic surface wave to a liquid resting on the substrate, as described in J. Campbell and W. Jones, IEEE Trans. Sonics Ultrason., 17: 71 (1970), preferably so that the ratio of the size of the droplet to the length of transmission of the ultrasonic surface wave is between 0.04 and 10. A person skilled in the art is able to adjust the amplitude of the ultrasonic surface wave. For example, a droplet of a liquid of higher surface tension than a droplet formed from another liquid requires the application of a higher amplitude. The same applies to a droplet of higher viscosity.

Preferably, the fundamental frequency and the amplitude of the ultrasonic surface wave are adjusted so that the ratio of the amplitude of oscillation of the droplet to the size of the droplet at rest is less than or equal 1.4, or even less than or equal to 1.3, or even less than or equal to 1.15. "Amplitude of oscillation" of the droplet means the largest diameter of the smallest sphere circumscribing the droplet, measured over a period of vibration of the droplet, when a surface acoustic wave is applied to the substrate.

Different types of ultrasonic surface waves may be generated and notably are adapted to the geometry of the substrate.

Preferably, the ultrasonic surface wave is a Lamb wave or a Rayleigh wave. In particular, it may be a Rayleigh wave when the substrate has a thickness greater than the wavelength of the ultrasonic surface wave. A Rayleigh wave is preferred because a maximum proportion of the energy of the wave is concentrated on the surface on which it is propagated, and may be transmitted to the droplet to make it vibrate.

Preferably, the fundamental frequency of the ultrasonic wave of ultrasonic surface is between 1 MHz and 100 MHz. In one embodiment, it may be between 5 MHz and 40 MHz, and notably may be equal to 20 MHz.

Moreover, the fundamental frequency of the ultrasonic surface wave may be modulated at a modulation frequency between 20 Hz and 10 kHz, notably to optimize the vibrational regime according to an inertio-capillary mode, as a function of the size of the droplet. Preferably, the fundamental frequency of the surface wave is modulated by the natural frequency of the inertio-capillary eigenvibration mode of the droplet. The natural frequency $f_g$ of the droplet can be determined approximately from the Rayleigh-Lamb formula, described in J. Rayleigh, Proc. R. Soc. London, Vol. 29, 71 (1879) and H. Lamb, "*Hydrodynamics*", Cambridge University Press, England (1932):

$$f_g = \frac{1}{2\pi}\sqrt{\frac{n(n-1)(n+2)\sigma}{\rho R^3}}$$

where:
n denotes the order of the vibration mode, which is for example equal to 2 in the case of a quadrupolar vibration mode,
σ is the surface tension, expressed in N·m$^{-1}$,
ρ is the density of the liquid, expressed in kg·m$^{-3}$, and
R is the radius of curvature of the droplet, which depends on its volume and on the contact angle, expressed in m$^{-3}$.

In fact the aforementioned natural frequency $f_g$ is calculated for a droplet that is of low viscosity, and is levitated. For a deposited droplet, calculation of the natural frequency must be adapted using the modifications proposed by M. Strani and F. Sabetta, J. Fluid Mech., 141: 233-247 and in the case of viscous liquids, the corrections to the above formula described in the article by H. Lamb cited above must be taken into account.

The fundamental frequency may be modulated by means of a wave having a pulsed profile whose amplitude has a value of 0 or 1, and whose frequency is equal to the modulation frequency, or via the product of two harmonic signals at the two frequencies considered.

Moreover, the amplitude of the ultrasonic surface wave is sufficient to cause the droplet to be deformed according to an inertio-capillary eigenvibration mode. Preferably, the amplitude of the ultrasonic surface wave, which corresponds to the normal movement of the surface of the substrate on which the ultrasonic surface wave is propagated, measured by laser interferometry, is less than 50 nm. In a particular embodiment of the method, it may be less than 5 nm, or even less than 1 nm, or even less than 0.5 nm.

Various devices, supplied by a source of electric power and optionally an amplifier 18, may be used for generating the ultrasonic surface wave. They may be selected from a laser, a miniature hearing aid, a transducer. Preferably, the ultrasonic surface wave is generated by means of a transducer connected to the substrate, preferably in contact with the substrate.

In one embodiment, the transducer is a contact ultrasonic transducer, which is particularly suitable for applications in which the area of the surface on which the ultrasonic surface wave is propagated is greater than 10$^{-3}$ m$^2$. To optimize the propagation of the wave from the transducer to the surface of the substrate, a transmission gel of impedance-adapted acoustic index may be sandwiched between the acoustic transducer and the surface.

In a first variant, as illustrated in FIG. 1, notably when the substrate has a thickness less than the length of the ultrasonic surface wave and/or when the latter is a Lamb wave, the contact ultrasonic transducer 20*a* is preferably arranged at right angles to the surface on which the ultrasonic wave is propagated. A second transducer of the same type may be arranged on the surface opposite that on which the ultrasonic wave is propagated.

In a second variant, as illustrated in FIG. 2, notably when the substrate has a thickness greater than the length of the ultrasonic surface wave and/or when the latter is a Rayleigh wave, the contact ultrasonic transducer 20*b* is arranged, for example by means of a shoe 25, so that the axis of the transducer makes an angle θ with the normal to the surface on which the ultrasonic surface wave is propagated, less than 90°, and whose value may be determined using the Snell-Descartes law.

Figure 3:
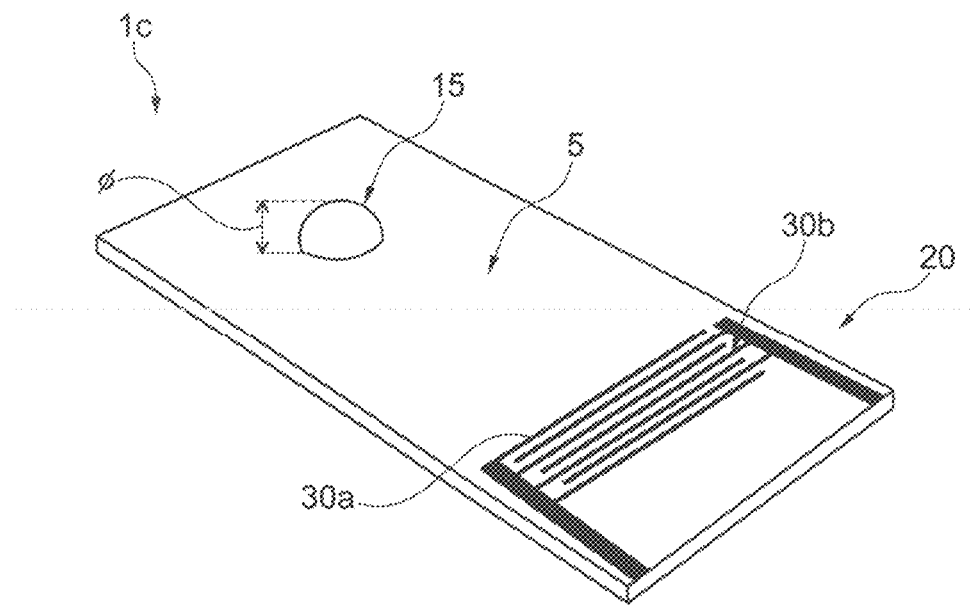
Figure 4:
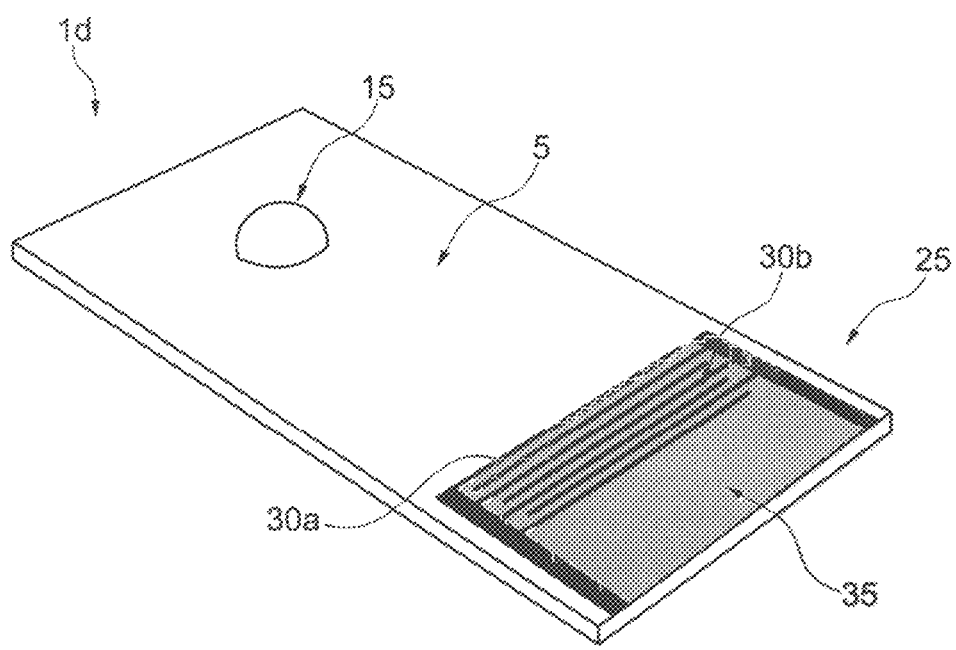

In another embodiment, notably for applications in which the area of the surface on which the ultrasonic surface wave is propagated is less than 10$^{-3}$ m$^2$ and in particular applications of the microfluidic type, the transducer 20 preferably comprises interdigitated combs 30*a*, 30*b* arranged in direct contact with the substrate or in contact with an intermediate layer arranged on the substrate, the intermediate layer being made of a piezoelectric material, in particular selected from the group comprising lithium niobate, aluminum nitride, lead zirconate titanate, and mixtures thereof. FIGS. 3 and 4 illustrate devices according to this embodiment. In FIG. 3, the substrate 5 is made of piezoelectric material and is covered by and in contact with the transducer. As a variant, as illustrated in FIG. 4, the substrate 5 is a nonpiezoelectric material, and is covered by an intermediate layer 35 of a piezoelectric material. A transducer is arranged in contact with the intermediate layer.

In the case of a substrate having a high propagation area of the surface wave, for example greater than 10$^{-3}$ m$^2$, or when the surface is covered with a plurality of droplets, a plurality of ultrasonic surface waves may be generated by means of an array of transducers. An array of transducers thus makes it possible to limit the effects of screening and wave scattering by each individual droplet of the plurality of droplets. A person skilled in the art is able to adapt the arrangement of the transducers of the array so as to generate ultrasonic surface waves having a sufficient amplitude to cause the droplets to be deformed according to an inertio-capillary mode.

External Force

The external force makes it possible to promote sliding of the droplet, which vibrates according to a natural inertio-capillary mode.

In particular, sliding may be obtained with a small external force. Preferably, the external force is less than the force necessary to move the droplet on the surface of the substrate when no ultrasonic wave is generated at the surface of the substrate.

Preferably, the external force is selected from gravitational, inertial, reaction, frictional, magnetic, and electrical forces, or may result from setting a fluid, for example air, in motion, or may result from contact of the droplet with a moving body. Preferably, it is a gravitational force, in particular in the variant in which the substrate is inclined. A gravitational force has the advantage that it does not require any particular device for it to be applied to the droplet. The external force may of course result from a combination of the external forces described in this paragraph.

For purposes of illustration, in the case when the substrate is an inclined windshield of a motor vehicle, the external force may have a gravitational component and an aerodynamic component resulting from the motion of the vehicle. At low speed, the aerodynamic component is weaker than the gravitational component, so that the action of the external force promotes sliding of the droplet downwards. However, when the vehicle is travelling at high speed, the aerodynamic component may become predominant, and the droplet then slides under the action of the external force on the windshield toward the roof of the vehicle.

EXAMPLES

A device such as illustrated in FIG. 3 is prepared for implementing the method according to the invention.

The substrate is inclined relative to the horizontal by an angle α between 10 and 40°.

The substrate is made of 128° cut lithium niobate, on which a transducer is arranged comprising interdigitated electrodes deposited by photolithography. These electrodes consist of a keying coat on the titanium substrate with a thickness of 20 nm and a conductive layer of gold with a thickness of 100 nm. The width of the electrodes and their spacing are both equal to 43.75 μm. They determine the resonance frequency $f_{saw}$ of the transducer calculated as being equal to $$f_{saw} = \frac{c_s}{\lambda} = \frac{c_s}{4a} = 19.7 \text{ MHz},$$

where λ is the wavelength of the longitudinal wave and $c_s$=3484 m/s is the propagation velocity of the Rayleigh wave along the crystallographic axis Z of the lithium niobate. An alternating voltage is applied by an IFR2023A generator and is amplified by an amplifier made by Empower, model BBM0D3FE1, then generating Rayleigh waves that are propagated over the surface of the substrate. The acoustic power of the wave generated is calculated on the basis of measurement of the normal movement of the surface by laser interferometry and the frequency of the wave.

The transducer is positioned on the substrate in such a way that the ultrasonic surface wave is propagated in the direction of inclination of the substrate upward.

Moreover, a monatomic layer of octadecyltrichlorosilane is deposited on the surface of the substrate to make it hydrophobic and to control the contact angle of the droplet with the substrate.

A droplet of water is deposited on the substrate for each test.

Different droplet volumes V are used for the tests: 2 μl, 5 μl, 10 μl and 15 μl.

At rest, without application of an ultrasonic surface wave, the droplet is immobile on the surface, regardless of the angle of inclination of the substrate.

The waves are then generated continuously. The droplet then begins to vibrate and its dynamics is recorded using a Photron SA3 high-speed camera equipped with bellows and a macro lens with a focal length of 100 mm.

The position of the lines of contact is then determined by processing the images acquired by the camera with imageJ software, which makes it possible to verify if the droplet remains attached to the substrate or if it has been released from it.

Waves with an acoustic Weber number $We_{ac}$ below 0.5 are generated for the different tests in the example.

The acoustic Weber number $We_{ac}$ characterizes the ability of an ultrasonic surface wave to deform the surface. It is expressed by the following equation:

$$We_{ac} = \frac{\rho A_s^2 \omega_s^2 R}{\sigma \cos^2 \theta_R}$$

where:

ρ is the density of the liquid, expressed in kg·m$^{-3}$, $A_s$ is the amplitude of the ultrasonic wave, corresponding to the normal movement of the surface of the wave measured by laser interferometry, and expressed in m, $\omega_s$ is the pulsation of the ultrasonic wave, expressed in rad·s$^{-1}$ ($\omega_s$=2π$f_s$ where $f_s$ is the fundamental frequency of the wave), $$R = \left(\frac{3V}{2\pi}\right)^{\frac{1}{3}}$$

is the equivalent radius of the droplet calculated from the volume V of the droplet, expressed in m$^{-3}$, $\theta_R$ is the Rayleigh angle, obtained from the Snell-Descartes law, which characterizes the direction of propagation of the sound wave within the liquid forming the droplet, and σ is the surface tension between the substrate and the droplet of liquid, expressed in N·m$^{-1}$.

Regardless of the inclination of the substrate, for an ultrasonic wave having an acoustic Weber number $We_{ac}$ below 0.2, the droplet vibrates according to an inertio-capillary mode and it is released from its attachment to the substrate. It then slides along the substrate downward, driven by the action of gravity.

For comparison, when the Weber number is above 0.2, the asymmetric deformation of the droplet induced by the surface wave is sufficient for it to deform in the direction of propagation of the wave. For a small angle of inclination, it is propagated in the direction of propagation of the wave, rising along the substrate. For a larger angle, it is propagated in the opposite direction.

For Weber numbers above 1, the asymmetric deformation of the droplet may be such that the droplet breaks up. This breaking-up of the droplet may occur through atomization of the droplet or because of the opposite effects of the gravitational and acoustic forces.

Of course, the invention is not limited by the examples, which are only supplied for purposes of illustration.

The invention claimed is:

1. A method for promoting sliding of at least one droplet on a substrate, wherein an ultrasonic surface wave is generated in the substrate with an amplitude sufficient to cause the at least one droplet to be deformed according to an inertio-capillary eigenvibration mode thus reducing attachment of the at least one droplet to the substrate, so as to facilitate movement of the at least one droplet under the effect of an external force, the amplitude of the ultrasonic surface wave being insufficient to cause asymmetric deformation of the at least one droplet to the point of causing it to move in the absence of the external force in the direction of propagation of the ultrasonic surface wave, the fundamental frequency of the ultrasonic surface wave being at least 1 MHz.

2. The method as claimed in claim 1, in which the fundamental frequency and the amplitude of the ultrasonic surface wave are adjusted so that the ratio of the amplitude of oscillation of the at least one droplet to the size of the at least one droplet at rest is less than or equal 1.4.

3. The method as claimed in claim 1, in which the fundamental frequency of the ultrasonic surface wave is 100 MHz at most.

4. The method as claimed in claim 1, in which the fundamental frequency of the ultrasonic surface wave is modulated at a frequency of modulation between 20 Hz and 10 kHz.

5. The method as claimed in claim 4, in which the fundamental frequency of the ultrasonic surface wave is modulated by the natural frequency of the symmetric inertio-capillary eigenvibration mode of the at least one droplet.

6. The method as claimed in claim 1, in which the ultrasonic surface wave is a Rayleigh wave or a Lamb wave.

7. The method as claimed in claim 1, in which the at least one droplet has a size ($\phi$) less than 5 mm.

8. The method as claimed in claim 1, in which the natural frequency of the inertio-capillary eigenvibration mode of the at least one droplet is between 20 Hz and 10 kHz.

9. The method as claimed in claim 1, in which the substrate is made of a material having an elastic modulus above 0.1 MPa.

10. The method as claimed in claim 1, in which the substrate is made of a material selected from piezoelectric materials, polymers, glasses, metals and ceramics.

11. The method as claimed in claim 1, in which the ultrasonic surface wave is generated by means of a transducer connected to the substrate.

12. The method as claimed in claim 11, in which the transducer comprises interdigitated combs arranged in direct contact with the substrate or in contact with an intermediate layer arranged on the substrate, the intermediate layer being made of a piezoelectric material.

13. The method as claimed in claim 1, in which the external force is selected from gravitational, inertial, reaction, magnetic, electrical, and frictional forces.

14. The method as claimed in claim 1, in which the liquid forming the at least one droplet is selected from water, a biological fluid, a liquid for cleaning the substrate, a chemical solution, a motor fuel and mixtures thereof.

15. The method as claimed in claim 1, in which the substrate is made of an optically transparent material.

16. The method as claimed in claim 1, in which the substrate is selected from glazing of a vehicle, a window pane of a building, a lens of an optical device, a substrate of a laboratory on a chip, an inside wall of a combustion engine, an element of a turbine, an electric cable, an element of the structure of an aircraft, an element of a medical implant, an element of a heat exchanger, an element of a plumbing installation, an element of a ventilation system, an element of a system for extracting oil from a well, a food storage element, a wall exposed to condensation of a liquid.

17. The method as claimed in claim 1, in which a surface temperature of the substrate is above 100° C.

* * * * *